United States Patent
Lewis-Hawkins

(10) Patent No.: US 7,668,756 B2
(45) Date of Patent: *Feb. 23, 2010

(54) METHOD OF PROVIDING CUSTOMER SERVICES

(75) Inventor: Virginia Lewis-Hawkins, Alabaster, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 309 days.

This patent is subject to a terminal disclaimer.

(21) Appl. No.: 11/827,116

(22) Filed: Jul. 10, 2007

(65) Prior Publication Data

US 2007/0260530 A1 Nov. 8, 2007

Related U.S. Application Data

(63) Continuation of application No. 10/233,552, filed on Sep. 4, 2002, now Pat. No. 7,243,078.

(51) Int. Cl.
*G06Q 30/00* (2006.01)
*G06F 3/00* (2006.01)

(52) U.S. Cl. .......................................... 705/26; 715/758
(58) Field of Classification Search .................... 705/26, 705/27; 715/758
See application file for complete search history.

(56) References Cited

U.S. PATENT DOCUMENTS

| 6,070,149 A | 5/2000 | Tavor et al. |
| 6,295,551 B1 | 9/2001 | Roberts et al. |
| 6,330,243 B1 | 12/2001 | Strandberg |
| 6,519,628 B1 | 2/2003 | Locascio |
| 6,665,395 B1 | 12/2003 | Busey et al. |
| 6,718,313 B1 | 4/2004 | Lent et al. |
| 6,795,093 B1 | 9/2004 | Chesley et al. |
| 6,889,195 B2 | 5/2005 | Strandberg |
| 7,181,696 B2 | 2/2007 | Brock |
| 2001/0054064 A1 | 12/2001 | Kannan |
| 2002/0059098 A1* | 5/2002 | Sazawa et al. ................. 705/14 |
| 2002/0072974 A1 | 6/2002 | Pugliese et al. |
| 2003/0030670 A1 | 2/2003 | Duarte et al. |
| 2003/0159128 A1* | 8/2003 | Kunzler ....................... 717/109 |
| 2003/0187672 A1 | 10/2003 | Gibson et al. |
| 2005/0097000 A1 | 5/2005 | Freishtat et al. |

FOREIGN PATENT DOCUMENTS

WO WO-9918514 A1 4/1999

OTHER PUBLICATIONS

Briody, D., "Holiday Crunch is on for IT," InfoWorld, vol. 21, No. 40, pp. 1, 30, Oct. 4, 1999.*
Wilcox, M.D., "Service with a Smile," Kiplinger's Personal Finance Magazine, vol. 55, No. 2, p. 21, Feb. 2001.*

(Continued)

*Primary Examiner*—Nicholas D Rosen
(74) *Attorney, Agent, or Firm*—Greenblum & Bernstein, P.L.C.

(57) ABSTRACT

A method for providing real-time individualized customer support simultaneously to a plurality of customers in a chatroom environment is disclosed. The method monitors the content of chats or conversations between service representatives and customers to automatically formulate product and service offerings and other services to customers in response to the chat content.

19 Claims, 4 Drawing Sheets

OTHER PUBLICATIONS

"Live Person" [online], [retrieved on May 30, 2002], 2 pp., Retrieved from: http://www.liveperson.com/ent/corp.asp.

Contact Options [online], [retrieved on May 30, 2002[, 1 p., Retrieved from: http://www.turbotaxsupport.com/contactoptions.asp.

"ChatSpace Community Server" [online], 1 p., [retrieved on May 30, 2002], Retrieved from: http://www.akiva.com/print.cfm?print=/products/commserv/index.cfm&&from=www.Chatspace.com.

Chiranky, L., "Web Power: Taking Call Centers to New Dimensions," Telemarketing & Call Center Solutions, vol. 15, No. 7, p. 96, Jan. 1997.

Chiranky, L., "Customer Advocacy Paradigm: the Bonnie Button and Beyond," Telemarketing & Call Center Solutions, vol. 15, No. 7, p. 98, Jan. 1997.

* cited by examiner

METHOD OF PROVIDING CUSTOMER SERVICES

CROSS-REFERENCE TO RELATED APPLICATION

This is a continuation of U.S. patent application Ser. No. 10/233,552, filed Sep. 4, 2002 and now U.S. Pat. No. 7,243,078.

TECHNICAL AREA

The present invention relates to automated customer support methods.

BACKGROUND OF THE INVENTION

Various methods exist for providing support to customers and purchasers of products and services. The types of support typically required by customers include questions about the operation or use of a product or service, questions about a recent or outstanding bill, complaints about a service or product, payment of outstanding bills, and inquiries regarding additional services or products. Customers needing support want a system that is easy to use, fast, reliable, individualized, and personal.

Phone support methods provide customers with individualized, one-on-one attention; however, a customer service representative must be dedicated to each customer inquiry, creating the need for a significant number of customer service representatives and the potential for substantial delays in service when customers are placed on hold. Even after completion of a service call, substantial service representative time is required to generate reports or logs of the service call and to handle any follow-up work. In addition, phone support systems often require customers to step through a multitude of tedious and confusing sorting prompts.

Support methods utilizing telefacsimile responses to customer inquiries have lower demands on customer service representative time and can easily handle frequently asked questions and provide detailed instructions. Such methods, however, are not easy to use and often require the customer to have a relatively detailed understanding of the problem. In addition, these methods are not fast and are not individualized.

Support methods utilizing the internet and e-mail provide similar types of benefits and challenges. E-mail allows a customer to type in the request in any form, and a customer service representative interprets the request and provides the necessary response. Unfortunately, significant delays between an e-mail request and an e-mail response are typical. On-line chats provide a direct interface with a service representative, but still require a larger number of dedicated service representatives and significant post-session follow-up by the service representative.

A customer support method is needed that can easily and rapidly provide support to customers for all types of customer requests. This system would preferably maximize the individualized attention to each customer while minimizing the time demands on each customer service representative. In addition, the customer support method should take advantage of this time spent interacting with existing customers to illustrate and offer additional services and products to these customers.

SUMMARY OF THE INVENTION

The present invention is directed to a method of providing real-time, individualized customer support in an on-line, chat-room type environment. The method monitors the content of an unstructured chat between a customer and a service representative and, based upon that content, offers services or products to the customer, schedules follow-up procedures for the customer, provides information to the customer, and processes billing inquiries and bill payments.

Any type of customer service inquiry can be handled, and two or more customers can be served simultaneously by a single customer service representative. The method utilizes profile information about customers, standard on-line chat protocols, and pre-set and stored inquiries and responses.

DETAILED DESCRIPTION

The present invention provides for an improved method to provide customer service using a real-time, on-line, chat-type interface between a customer service representative and one or more customers. The method of the present invention is used with any type of customer inquiry including technical support, complaints, billing inquiries, bill payments, product and service inquiries and purchases, and combinations thereof for any type of business that sells products and services. The method contributes to the maximization of service representative time by permitting the handling of multiple customers simultaneously by a single representative and by automating the processing and follow-up of customer service inquiries. Automation is achieved by continuously monitoring the content of the conversation or chat between the customer service representative and each customer and automatically processing customer requests and bill payments, scheduling follow-up service, offering each customer additional services or products for purchase, or combinations thereof based upon this content.

Figure 1:
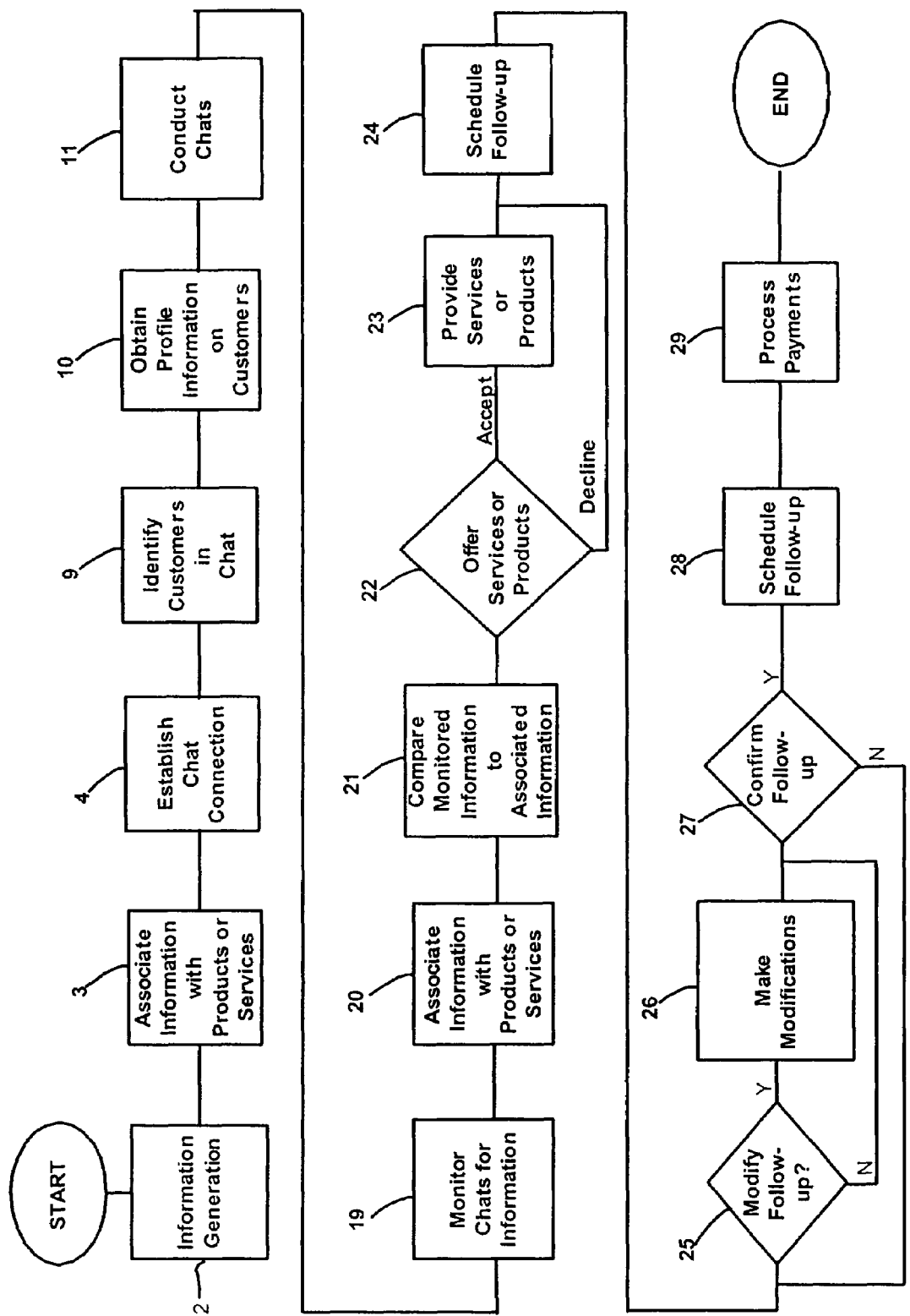
FIG. 1 is a flow chart illustrating an embodiment of the method of the present invention.

Referring initially to FIG. 1, in order to provide a customer service method 1 according to the present invention, a product or services provider wanting to provide support to customers generates a list of pre-determined, selected information. This information includes indicia of the conversation between a service representative and a customer and is in forms including numbers, letters, alpha-numeric codes, words, phrases, keywords or descriptors, sentences, commands, figures, and combinations thereof. The information also includes references to the context in which various types of information appear. The provider selects information to be included in the list that is related to or describes either the products, including both products and services, that the provider sells to customers or services that the provider makes available to customers using the method of the present invention. In one embodiment, the provider chooses information that is descriptive of products and services that the provider sells to customers. In another embodiment, the provider chooses information that is likely to be exchanged or is typically exchanged between a customer service representative and a customer when either discussing a particular product sold by the provider or when providing a particular type of service to a customer using the method of the present invention.

The provider also generates a product list of the products, goods, and services that it sells to customers and a list of the support services provided to customers according to the method of the present invention. For each product and each support service listed, the service provider creates an information file and an action file. The information file contains a description of the product or support service for which it was created. The action file contains a plurality of actions, procedures or steps to be executed in relationship to the product or support service for which it was created. These actions include computer executable programs or routines to be automatically executed by the provider including programs to deliver or display the contents of the information file to the customer, to offer a product for purchase to a customer and to complete a purchase of that product by the customer, to offer a subscription for a service to a customer and to complete the purchase of that subscription by the customer, and to automatically complete a support service for the customer such as bill payment or product refunds and exchanges.

After generating the information, product list and list of support services including associated files, the service provider then associates each piece of information from the list, either alone or in combination, with one or more products or customer support services. All of the generated information, lists, files, programs, and associations is stored in one or more databases that are accessible by the provider either directly or across a local area or wide area network. Suitable databases include databases and networked databases that are readily available and known to one of skill in the art.

In order to initiate a customer service session, a real-time, on-line electronic chat connection is established 4 between at least one service device and at least one customer device. Both the service device and the customer device are capable of entering, transmitting, exchanging and receiving information across the chat connection. Suitable devices include personal computers, mainframe computers, wireless communication devices, personal digital assistants, and combinations thereof. Chat connections can be established across network and dial-up connections, including local networks and wide area networks such as the internet, by all known and readily available systems and methods for such connections.

Figure 2:
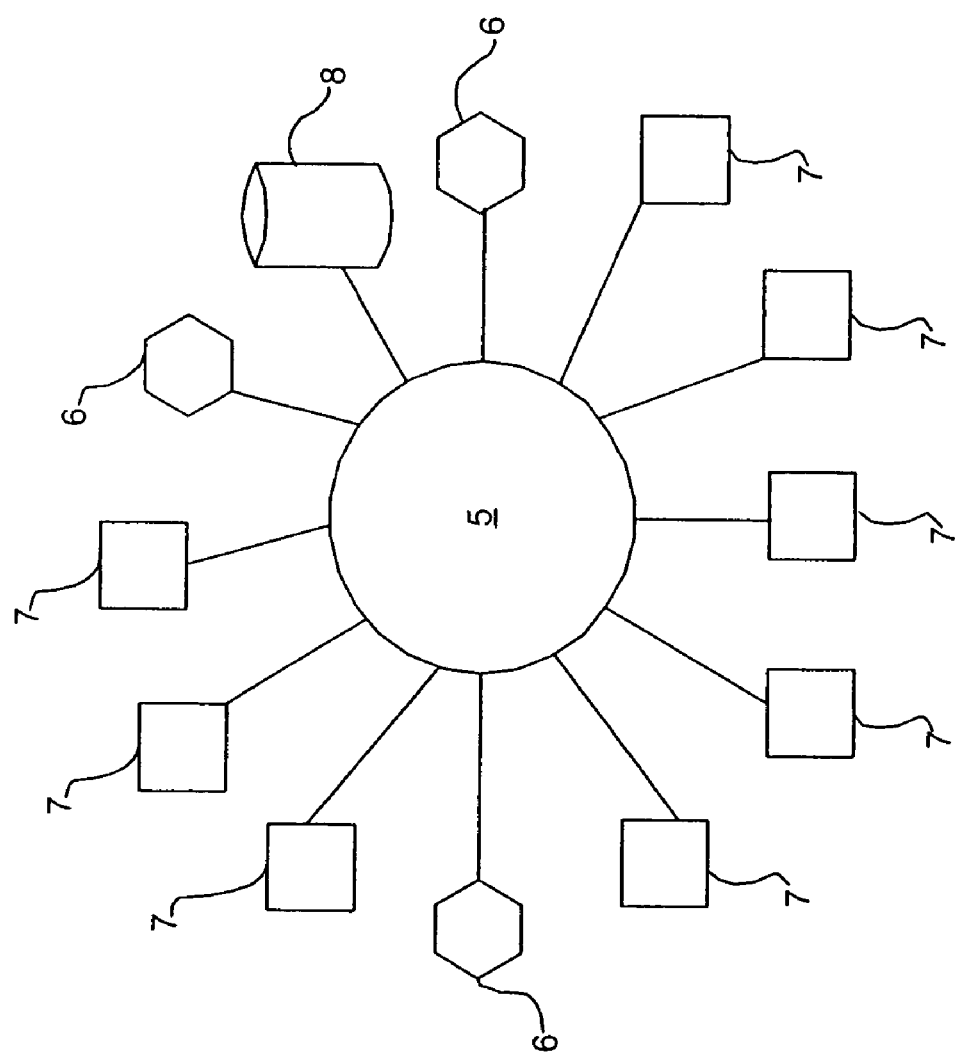
FIG. 2 is a schematic of a chat connection network for use with the method of the present invention.

As illustrated in FIG. 2, the method of the present invention can be used to establish chat connections across a network or a chat room 5 among a plurality of customer service devices 6 and a plurality of customer devices 7. In general, the service devices are associated with a customer service representative and the customer devices are associated with a customer. In a preferred embodiment, a chat connection is established between a single service representative and a plurality of customers. The network also has access to a database 8 where the information and information associations are stored. The database can also include profile information for each customer.

In order to facilitate offering and delivering services and products to the correct customers, particularly when multiple customers are simultaneously participating in chats, the customers associated with the customer connections established for the customer service session are identified 9. Profile information for each identified customer is then obtained 10. Suitable profile information includes the customer name, customer address, alternate contact information, billing information, services to which the customer has subscribed, products that the customer has purchased, and combinations thereof. This profile information can be stored in the database 8.

Figure 3:
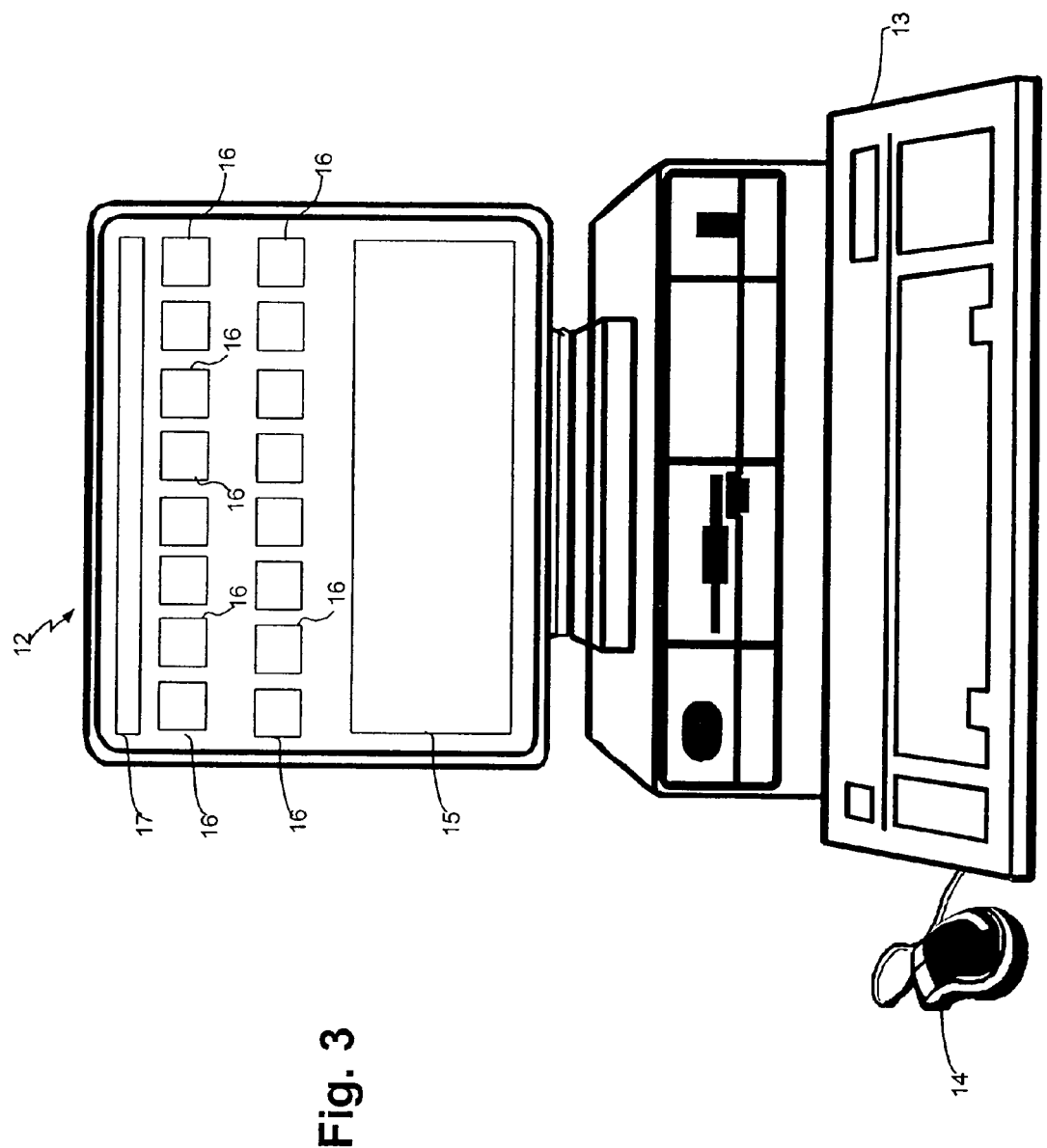
FIG. 3 is an illustration of an embodiment of a computer interface for use with the method of the present invention.

Having established the desired customer connections and identified the participants, a chat between at least one customer service representative and at least one customer is conducted 11. In another embodiment a plurality of chats are conducted among a plurality of customer service representatives and a plurality of customers. In a preferred embodiment, a plurality of simultaneous chats are conducted between a single customer service representative and each one of a plurality of customers. The chat is conducted by exchanging or transferring information, for example questions and answers, between chat participants across the chat connection. As illustrated, for example, in FIG. 3 for a chat between a customer service representative and a customer each using a computer as the chat connection device 12, the information can be entered using any conventional method for inputting information to a computer including a keyboard 13 and a pointing device 14 such as a mouse. The information sent or received is displayed in an information text box 15. Alternative methods for entering information include using "hot" keys, i.e. CTRL, function keys, and combinations thereof. A plurality of standard response windows 16 are also provided to facilitate common or repetitive transmissions such as, for example, "Yes", "No", "More Information", "Accept", "Decline", or "Skip".

The standard response windows 16 can also be used to select and transmit pre-set and stored arrangements or compilations of information. For example, the standard response windows can represent standard or frequently asked questions from customers, standard answers to frequently asked questions, current promotions for products and services, general services such as bill payment and combinations thereof. In order to facilitate the real-time appearance of the chat and to facilitate the handling of multiple customers by a single service representative, in one embodiment of the present invention a standard response sent from a service representative to a customer is scrolled out in the customer's information text box 15 as if the service representative is typing the response in real-time. Standardized responses and inquiries can also be accessed using "hot" keys, function keys and combinations thereof.

Figure 4:
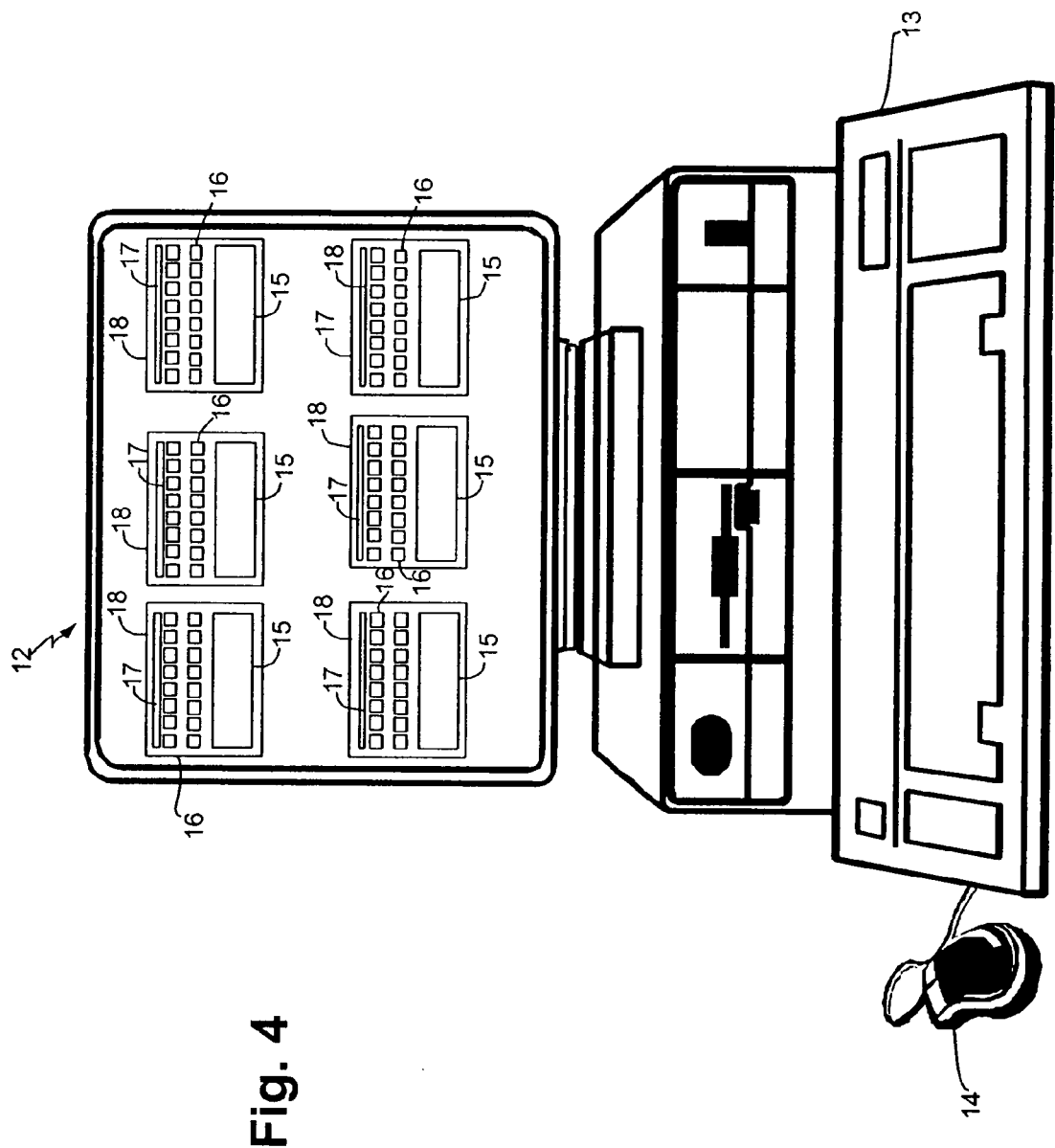
FIG. 4 is an illustration of another embodiment of a computer interface.

The display of the chat connection device also includes a customer profile window 17. This window displays some or all of the profile information available for that customer. Similarly, information about the customer service representative can also be displayed in this window. In an embodiment where a single customer service representative is simultaneously assisting a plurality of customers, as shown for example in FIG. 4, a plurality of chat windows 18 appear on the display of the service representative's chat connection device. The service representative can simultaneously monitor inquiries from multiple customers and can selectively activate chat windows to provide responses.

Returning to FIG. 1, the provider uses one or more computers to monitor the information exchanged between the customer service representative and the customers during the chat. Each one of these monitoring computers is in communication with both ongoing customer service chats and the database containing the generated information, lists, files, programs, associations, and profile information. In addition, these computers contain software capable of recognizing the exchanged information and of comparing that exchanged information to the list of pre-determined, selected information stored in the database.

In order to monitor a customer service chat, the provider simultaneously routes the exchanged information to the intended recipient and to at least one of the monitoring computers that are in communication with the chat. The software resident in that computer reads the exchanged information from each chat session and compares the exchanged information to the stored lists of information, looking for matches between the exchanged information and the stored information. When the software identifies matches it also analyzes the context in which the matched exchanged information is found including the identity of the recipient and sender of the information and any punctuation such as question marks. When a plurality of customers are simultaneously involved in chats, the software also associates the matched exchanged information with the particular customer that either transmits or receives that information 20. In one embodiment, monitoring occurs continuously throughout the chat. In another embodiment, monitoring is undertaken on discrete packets of exchanged information at regular intervals during the course of each chat.

After the software has identified matched exchanged information, the software checks the database for the product and customer services associated with the matched exchanged information and any action or information files assigned to those products and customer services. The information and action files are uploaded to one of the monitoring computers that is in communication with the chat. The recipient monitoring computer then executes the action files which automatically triggers actions including offering of the product associated with the matched exchanged information to the customer associated with the monitored exchanged information 22. Other actions include delivering the contents of the information file to the associated customer and processing bill payments for the associated customer. In one embodiment, the products or services are offered at the conclusion of the chat. In another embodiment, the products or services are offered continuously throughout the duration of the chat.

The products that the provider sells to customers and the support services may also be offered to a customer in response to the selection and transmission of one of the pre-set and stored arrangements of information. These pre-set and stored arrangements of information are represented, for example, by the standard response windows 16 available to both the customer service representatives and to the customers. Upon initiation of a chat session, a customer can choose a standard window having the display "Bill Payment". The monitoring computer, in response to receiving notice that "Bill Payment" has been selected, will retrieve files from the database associated with that standard window and will execute those files. The monitoring computer will then prompt the customer through the bill payment process. The customer service representative will not be required to actively participate in the session; however, a shadow display or copy of the customer's bill payment session can be displayed on the service representative's screen. A customer can also select pre-set functions or information using function keys or standardized key strokes. For example, the customer can see a display of any current sales promotions by selecting the keys "CTRL-P".

The customer service representative will also have a selection of standard response windows to choose from. If, for example, the service representative notices during a chat session that a phone mail product may be beneficial to the customer, that representative can select the "Phone Mail" button. The monitoring computer will again recognize this entry and will retrieve the associated files and information from the database. The monitoring computer will then forwarded information about the phone mail product to the customer. This information can include an offer to purchase the phone mail product.

Once the products and services are offered, the customer can then accept or decline the offered services or products 23. If accepted, the order for the products or services is processed, and the products or services are provided to the customer. All of the necessary information for processing and filling the order is obtained from the profile information associated with that customer. Preferably, no additional input is required from either the service representative or the customer to complete the order.

In another embodiment, identified matches between the exchanged information and the predetermined list of information will automatically schedule a follow-up chat or a service call to the customer's premises 24. The customer is then provided with the opportunity to modify the parameters of the follow-up 25 including the date and time of the follow-up and the type of follow-up. The requested modifications to the follow-up are then made 26. The modified follow-up, or if no modifications were made the original follow-up is then confirmed 27. If not confirmed then additional modifications are requested including, for example, the cancellation of a follow-up. The confirmed follow-up is then scheduled. Again, no additional input is required to schedule and process follow-up actions.

In another embodiment, identified matches between the exchanged information and the predetermined list of information will result in the automatic processing and payment of an outstanding bill balance of the customer. All of the necessary information for the processing of payment is obtained from the profile for that customer. Each customer, however, may be prompted to provide additional payment information such as credit card information or bank account information. But, additional input will preferably not be required from the service representative.

In one example of using the method of the present invention, a customer who is often out of the office may want to explore the options for having calls forwarded to a cell phone, pager, or personal digital assistant. That customer accesses the service provider's web site via the internet and selects an option available on the web site to initiate a live customer service chat session. Suitable methods for selecting options on the service provider's web site include using a standard pointing device to highlight and select an icon that hyperlinks the customer to another website that contains the interface for the live customer service chat session. The service provider's web site then prompts the customer to log on by requesting an identification number and password from the customer. If the customer has an identification number and password, the customer enters that information to initiate a chat.

If the customer does not already have the requested information, the customer requests an identification number and password from the service provider. In order for the customer to obtain an identification number and password, the service provider asks the customer to complete a datasheet by providing information about the customer including name, contact information, and account numbers. This information is used by the service provider to construct the customer profile. Once the customer has successfully logged in, the service provider's computer network selects an available customer service representative and initiates a live chat session between the customer and that service representative. Once the chat session is initiated a chat window appears on the service representative's computer. The profile information for the customer is displayed in the customer profile window of that chat window. The service provider's network simultaneously selects a monitoring computer and connects that computer to the chat session.

The customer and customer service representative then engage in an on-line chat by typing a series of questions and answers. The software in the monitoring computer compares the words in the questions and answers to the list of information in the database. The software matches the words "forward", "phone calls" and "information" from the exchanged information. The computer then checks the database for any products associated with these words. Call forwarding is associated with these words, so the monitoring computer retrieves information and action files assigned to call forwarding. The action file contains one action that instructs the monitoring computer to display the contents of the retrieved information file at the customer's computer and a second option that instructs the monitoring computer to offer the customer a subscription to the call forwarding service. The contents of the information file are displayed immediately at the customer's computer. At the completion of the chat, an offer to subscribe to the call forwarding service is displayed in the customer's chat window. The customer can then accept or reject the offer using buttons that appear in the customer's standard response windows concurrently with the display of the offer. If the customer selects the accept button, then the provider's computer processes the order and delivers the order to the customer using information from the customer's profile.

In another example, a customer wants to obtain a billing statement and to pay any outstanding bill balance. After initiating a chat as described before, the customer begins by asking about the current bill status. The software matches the words, "bill", "balance", and "payment", and an assigned action file instructs the monitoring computer to display a "Current Account Information" button in one of the standard response windows on the customer service representative's computer. The customer service representative selects this button, and the monitoring computer displays the customer's current account statement and account history in the customer's chat window. At the same time, the monitoring computer displays a "Pay Current Bill" button, a "Pay Current Bill and Continue Chat" button, and a "Pay a Specified Amount" button in the customer's standard response windows. The customer then selects the desired button. If "Pay Current Bill" is selected, the monitoring computer processes the payment using information from the customer's profile, sends payment confirmation to the customer and terminates the chat.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A method of providing customer service comprising:
   establishing a real-time, on-line chat connection between at least one service device and at least one customer device, both devices being capable of entering and exchanging information across the chat connection;
   facilitating a chat between at least one customer service representative and at least one customer by exchanging information across the chat connection;
   selecting at least one pre-set arrangement of information for delivery from the customer service representative to the customer device;
   delivering the selected pre-set arrangement of information to the customer device so that the selected pre-set arrangement of information is presented to the customer device one character at a time as if being typed by the customer service representative in real time; and
   selecting a monitoring computer and connecting the monitoring computer to the chat, the monitoring computer being configured to receive and read the exchanged information, compare the exchanged information to at least one of a plurality of stored lists of information to identify at least one match, and analyze a context of the at least one match along with punctuation marks in the exchanged information.

2. The method of claim 1, wherein the customer device comprises one of a computer, a wireless communication device, and a personal digital assistant.

3. The method of claim 1, further comprising establishing the chat connection between at least one service device and a plurality of customer devices.

4. The method of claim 1, further comprising establishing the chat connection between a plurality of service devices and a plurality of customer devices.

5. The method of claim 1, further comprising offering a product to the customer based upon selected pre-set arrangements of information.

6. The method of claim 5, wherein offering of the product occurs upon conclusion of the chat.

7. The method of claim 5, wherein offering of the product occurs throughout the duration of the chat.

8. The method of claim 5, further comprising enabling modification of the offering by the customer.

9. The method of claim 5, further comprising receiving acceptance of the offer from the customer.

10. The method of claim 5, further comprising:
    generating a predetermined list of information;
    associating information from the predetermined list with a product offering; and
    offering the product to the customer based on the association.

11. The method of claim 1, further comprising scheduling a follow-up action based upon a comparison of the exchanged information to a pre-determined list of information.

12. The method of claim 11, further comprising confirming the follow-up action with the customer.

13. The method of claim 1, further comprising:
    identifying the customers participating in the chat; and
    obtaining profile information about those customers.

14. The method of claim 1, further comprising processing payment of an outstanding bill balance of the customer based upon a comparison of the exchanged information to a predetermined list of information.

15. The method of claim 1, wherein the selected pre-set arrangement of information is presented by scrolling out the selected pre-set arrangement of information to the customer.

16. A method of providing customer service comprising:
    establishing a real-time, on-line chat connection between at least one service device and a plurality of customer devices, the devices being capable of entering and exchanging information across the chat connection;
    facilitating a plurality of simultaneous chats among at least one customer service representative and a plurality of customers by exchanging information across the chat connection;

delivering at least one pre-set arrangement of information to at least one customer device one character at a time so as to appear as if being typed by the customer service representative; and selecting a monitoring computer and connecting the monitoring computer to the chat, the monitoring computer being configured to receive and read the exchanged information, compare the exchanged information to at least one of a plurality of stored lists of information to identify at least one match, and analyze a context of the at least one match along with punctuation marks in the exchanged information.

17. The method of claim 16, further comprising processing payment of a bill balance for each customer based upon a comparison of the exchanged information to a predetermined list of information and information associated with each customer.

18. The method of claim 17, further comprising:
identifying each customer participating in the chat; and
obtaining profile information about each customer.

19. The method of claim 16, wherein the selected pre-set arrangement of information is presented by scrolling out the selected pre-set arrangement of information to the customer.

* * * * *